United States Patent
Yamamoto et al.

(10) Patent No.: US 10,352,359 B2
(45) Date of Patent: Jul. 16, 2019

(54) THRUST ROLLER BEARING CAGE AND METHOD FOR MANUFACTURING THE SAME

(71) Applicant: NTN CORPORATION, Osaka (JP)

(72) Inventors: Kazuyuki Yamamoto, Shizuoka (JP); Hisataka Hasegawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/523,414

(22) PCT Filed: Nov. 6, 2015

(86) PCT No.: PCT/JP2015/081276
§ 371 (c)(1),
(2) Date: May 1, 2017

(87) PCT Pub. No.: WO2016/080211
PCT Pub. Date: May 26, 2016

(65) Prior Publication Data
US 2017/0314620 A1  Nov. 2, 2017

(30) Foreign Application Priority Data

Nov. 18, 2014  (JP) .................................. 2014-233493
Dec. 15, 2014  (JP) .................................. 2014-253274
(Continued)

(51) Int. Cl.
*F16C 19/46* (2006.01)
*F16C 33/54* (2006.01)
(Continued)

(52) U.S. Cl.
CPC ............ *F16C 19/463* (2013.01); *B21D 53/12* (2013.01); *F16C 19/305* (2013.01);
(Continued)

(58) Field of Classification Search
CPC .... F16C 33/546; F16C 19/463; F16C 19/305; F16C 2220/42; F16C 2240/30; F16C 2326/01; B21D 53/12
See application file for complete search history.

(56) References Cited

U.S. PATENT DOCUMENTS 2,978,282 A     4/1961  Fisher
3,240,542 A *   3/1966  Jahn ..................... F16C 19/305
                                                    384/623
(Continued)

FOREIGN PATENT DOCUMENTS

CN     101600891      12/2009
CN     102869893       1/2013
(Continued)

OTHER PUBLICATIONS

Machine Translation of JP 2006-250316 (Year: 2006).*
(Continued)

*Primary Examiner* — Alan B Waits
(74) *Attorney, Agent, or Firm* — Clark & Brody (57) ABSTRACT

A thrust roller bearing cage (11) of the present invention is included in a thrust roller bearing (20) and includes a plurality of pockets (21) accommodating rollers (13). The thrust roller bearing cage (11) includes: a first cylindrical portion (36) extending in a direction of a rotation axis (12); a first disc portion (31) continuous with the first cylindrical portion (36) and extending in a radially outward direction; and a second cylindrical portion (37) continuous with the first disc portion (31) and extending in the direction of the rotation axis (12). The first cylindrical portion (36), the first disc portion (31), and the second cylindrical portion (37) are formed in an area located radially inside the pockets (21). The height (H36) of the first cylindrical portion (36) in the direction of the rotation axis is smaller than the height (H37)

(Continued)

of the second cylindrical portion (37) in the direction of the rotation axis.

10 Claims, 8 Drawing Sheets

(30) Foreign Application Priority Data

| Jan. 9, 2015 | (JP) | ................................ | 2015-003487 |
|---|---|---|---|
| Jan. 9, 2015 | (JP) | ................................ | 2015-003505 |
| Jan. 9, 2015 | (JP) | ................................ | 2015-003508 |
| Jan. 9, 2015 | (JP) | ................................ | 2015-003512 |

(51) Int. Cl.
*F16C 33/66* (2006.01)
*F16C 19/30* (2006.01)
*B21D 53/12* (2006.01)

(52) U.S. Cl.
CPC .......... *F16C 33/541* (2013.01); *F16C 33/546* (2013.01); *F16C 33/6681* (2013.01); *F16C 2220/42* (2013.01); *F16C 2240/30* (2013.01); *F16C 2326/01* (2013.01)

(56) References Cited

U.S. PATENT DOCUMENTS

| 3,240,543 | A | | 3/1966 | Benson | |
|---|---|---|---|---|---|
| 3,652,141 | A | | 3/1972 | Husten et al. | |
| 5,630,670 | A | * | 5/1997 | Griffin | ..................... F16C 19/30 |
| | | | | | 384/606 |
| 6,742,934 | B2 | | 6/2004 | Matsuyama et al. | |
| 7,837,394 | B2 | | 11/2010 | Takamizawa | |
| 8,480,309 | B2 | | 7/2013 | Ince | |
| 8,627,570 | B2 | | 1/2014 | Takamizawa | |
| 9,593,714 | B1 | | 3/2017 | Ince | |
| 9,939,010 | B2 | | 4/2018 | Yamamoto et al. | |
| 2007/0206894 | A1 | | 9/2007 | Kotani et al. | |
| 2008/0019627 | A1 | * | 1/2008 | Takamizawa | ........... F16C 19/32 |
| | | | | | 384/455 |
| 2011/0229067 | A1 | | 9/2011 | Brown et al. | |
| 2013/0089286 | A1 | | 4/2013 | Fugel et al. | |
| 2016/0333936 | A1 | | 11/2016 | Kono et al. | |

FOREIGN PATENT DOCUMENTS

| JP | 08-200377 | | 8/1996 | |
|---|---|---|---|---|
| JP | 3037788 | | 5/1997 | |
| JP | 09-324817 | | 12/1997 | |
| JP | 10-220482 | | 8/1998 | |
| JP | 11-123458 | | 5/1999 | |
| JP | 2002250347 A | * | 9/2002 | ............. F16C 19/30 |
| JP | 2004-176781 | | 6/2004 | |
| JP | 2006-057742 | | 3/2006 | |
| JP | 2006-250327 | | 9/2006 | |
| JP | 2008-002503 | | 1/2008 | |
| JP | 2009-047239 | | 3/2009 | |
| JP | 2009-191981 | | 8/2009 | |
| JP | 2009174637 A | * | 8/2009 | .......... F16C 33/6674 |
| JP | 2009275794 A | * | 11/2009 | ............. F16C 19/30 |
| JP | 2011-106637 | | 6/2011 | |
| JP | 2011-144866 | | 7/2011 | |
| JP | 2014095458 A | * | 5/2014 | ............. F16C 19/30 |
| JP | 2015055274 A | * | 3/2015 | ............. F16C 19/30 |
| WO | 2009/086965 | | 7/2009 | |

OTHER PUBLICATIONS

Machine Translation of JP 2011-144866 (Year: 2011).*
Machine Translation of JP 2006-250327 (Year: 2006).*
Machine Translation of JP-2009174637-A (Year: 2009).*
Jianguo Lu et al., "China Electrical Canon", vol. 11, Feb. 28, 2009.

* cited by examiner

THRUST ROLLER BEARING CAGE AND METHOD FOR MANUFACTURING THE SAME

TECHNICAL FIELD

The present invention relates to thrust roller bearing cages (hereinafter sometimes simply referred to as the "cages") and methods for manufacturing the same, and more particularly relates to a thrust roller bearing cage that is manufactured by using a press and a method for manufacturing the same.

BACKGROUND ART

For example, thrust roller bearings that support thrust loads are sometimes placed at such locations in automatic transmissions for automobiles, car air conditioner compressors, etc. that are subjected to thrust loads. For improved fuel efficiency and power saving, it is desired to reduce running torque of such thrust roller bearings. A thrust roller bearing includes bearing rings arranged in the direction of the rotation axis of the thrust roller bearing, a plurality of needle rollers that roll on raceway surfaces of the bearing rings, and a cage that retains the plurality of needle rollers. Some cages are manufactured by bending a steel sheet and then punching out pockets that accommodate the rollers.

A technique relating to the cages included in such thrust roller bearings is disclosed in, e.g., Japanese Unexamined Patent Publication No. H10-220482 (Patent Literature 1). The thrust roller bearing cage of Patent Literature 1 includes an annular body having concave and convex portions formed in the thickness direction, and projecting portions formed in a radially outer part of the annular body. The projecting portions are formed such that those parts of the radially outer end face of the folded part of the annular body which are located at the positions of the pockets project inward in the radial direction, and the tip ends of the projecting portions face approximately the centers of the end faces of the rollers. Patent Literature 1 discloses that this thrust roller bearing cage reduces running torque of the rollers as the tip ends of the projecting portions contact the rollers at positions near the rotation center of the rollers.

CITATION LIST

Patent Literatures

Patent Literature 1; Japanese Unexamined Patent Application Publication No. H10-220482

SUMMARY OF INVENTION

Technical Problem

The inventors looked at the fact that the thrust roller bearing of Patent Literature 1 is disadvantageous in that lubricant does not flow satisfactorily therein. It is therefore an object of the present invention to provide a thrust roller bearing cage that allows a satisfactory flow of lubricant and a method for manufacturing the same.

Solution to Problem

The inventors found that the problem of an unsatisfactory flow of lubricant in the thrust roller bearing of Patent Literature 1 arises from the concave and convex portions being formed in the thickness direction in an area of the annular body which is located radially inside the pockets. The inventors completed the present invention through their intensive research regarding how to achieve a satisfactory flow of lubricant without increasing the amount of lubricant even if a cage has concave and convex portions in an area located radially inside pockets.

A thrust roller bearing cage according to the present invention is a thrust roller bearing cage included in a thrust roller bearing and including a plurality of pockets accommodating rollers. The thrust roller bearing includes: a first cylindrical portion extending in a direction of a rotation axis; a disc portion continuous with the first cylindrical portion and extending in a radially outward direction; and a second cylindrical portion continuous with the disc portion and extending in the direction of the rotation axis. The first cylindrical portion, the disc portion, and the second cylindrical portion are formed in an area located radially inside the pockets. The first cylindrical portion has a smaller height in the direction of the rotation axis than the second cylindrical portion.

A method for manufacturing a thrust roller bearing cage according to the present invention is a method for manufacturing a thrust roller bearing cage included in a thrust roller bearing and including a plurality of pockets accommodating rollers. The method includes the steps of preparing a cage material that will later become the cage; forming concave and convex portions in a thickness direction in the cage material; and forming the pockets in the cage material. In the step of forming the concave and convex portions, the concave and convex portions are formed so as to form a first cylindrical portion extending in a direction of a rotation axis, a disc portion continuous with the first cylindrical portion and extending in a radially outward direction, and a second cylindrical portion continuous with the disc portion and extending in the direction of the rotation axis and so that the first cylindrical portion has a smaller height in the direction of the rotation axis than the second cylindrical portion. In the step of forming the pockets, the pockets are formed at positions radially outside the second cylindrical portion.

According to the thrust roller bearing cage of the present invention and the method for manufacturing the same, the concave and convex portions are formed in the thickness direction in the area located radially inside the pockets by the first cylindrical portion, the disc portion, and the second cylindrical portion. Even though the cage has such concave and convex portions, the first cylindrical portion, which is located at an inner position in a radial direction, has a smaller height in the direction of the rotation axis than the second cylindrical portion, so that clearance provided by this difference in height in the direction of the rotation axis between the first cylindrical portion and the second cylindrical portion can serve as a lubricant flow path. The thrust roller bearing cage of the present invention and the method for manufacturing the same can thus achieve a satisfactory flow of lubricant.

It is preferable that the thrust roller bearing cage according to the present invention further include: a radially outer area bent portion formed by bending an area located radially outside the pockets inward in a radial direction; and projecting portions that are formed in a tip end of the radially outer area bent portion at positions aligned with the pockets and project inward in the radial direction beyond radially outer edges of the pockets so as to contact end faces of the rollers accommodated in the pockets.

It is preferable that the method for manufacturing the thrust roller bearing cage according to the present invention further include the steps of forming an outer shape of the cage material so that the outer shape has portions that will later become projecting portions projecting inward in a radial direction beyond radially outer edges of the pockets so as to contact end faces of the rollers accommodated in the pockets; and forming a radially outer area bent portion by bending an area of the cage material which is located radially outside the pockets inward in the radial direction.

Since the projecting portions can support the radially outer end faces of the rollers, running torque of the thrust roller bearing can be reduced.

In the thrust roller bearing cage according to the present invention, it is preferable that the radially outer area bent portion have a smaller height in the direction of the rotation axis than the second cylindrical portion.

In the method for manufacturing the thrust roller bearing cage according to the present invention, it is preferable that, in the step of forming the radially outer area bent portion, the radially outer area bent portion be formed so as to have a smaller height in the direction of the rotation axis than the second cylindrical portion.

Since the radially outer area bent portion, which is located at an outer position in the radial direction, has a smaller height in the direction of the rotation axis than the second cylindrical portion, clearance provided by this difference in height in the direction of the rotation axis between the radially outer area bent portion and the second cylindrical portion can serve as a lubricant flow path. A more satisfactory flow of lubricant can thus be achieved.

In the thrust roller bearing cage according to the present invention, it is preferable that areas of the projecting portions which are to contact the end faces of the rollers be subjected to a press-flattening process.

It is preferable that the method for manufacturing the thrust roller bearing cage according to the present invention further include the step of press-flattening areas of the projecting portions which are to contact the end faces of the rollers.

Since the areas of the projecting portions which are to contact the end faces of the rollers are subjected to the press-flattening process, this can reduce the risk that discontinuity of a lubricant film will be caused during rotation of the bearing by the sliding motion of the end faces of the rollers on the areas of the projecting portions which contact the end faces of the rollers. This improves lubricating properties in the contact areas and reduces what is called aggression of the rollers against the projecting portions of the cage. Such a thrust roller bearing cage can thus further reduce the running torque of the bearing.

As used herein, the "press-flattening process" means a process in which, in the step of forming the radially outer area bent portion, the projecting portions are pressed outward in the radial direction by using a radially outer surface of a die that serves as a stopper to control the amount of collapse, in order to smooth the rough surfaces of the projecting portions before and after the process. Specifically, the press-flattening process can smooth a press-sheared surface or a fracture surface, which is formed in the step of forming the outer shape, to arithmetic mean roughness Ra (JIS B 0601) of about 2 μm or less.

In the thrust roller bearing cage according to the present invention, it is preferable that the projecting portions be formed by bending a radially outer area of the cage obliquely inward in the radial direction.

In the method for manufacturing the thrust roller bearing cage according to the present invention, it is preferable that, in the step of forming the radially outer area bent portion, the area of the cage material which is located radially outside the pockets be bent obliquely inward in the radial direction.

The radially outer area bent portion is formed by bending the area located radially outside the pockets obliquely inward in the radial direction. Accordingly, the projecting portions formed in the tip end of the radially outer area bent portion have a smaller contact area with the rollers than in the case where the area located radially outside the pockets is not tilted (the tilt angle is 0°) as in Patent Literature 1. When the rollers are biased from the central axis of the cage toward the outside in the radial direction by a rotational centrifugal force of the rollers, friction is generated between each roller and the part of each projecting portion which contacts the roller. However, since the projecting portions have a smaller contact area with the rollers, rotational resistance can be reduced. Running torque can therefore be reduced.

Advantageous Effects of Invention

The thrust roller bearing cage of the present invention and the method for manufacturing the same allow a satisfactory flow of lubricant.

DESCRIPTION OF EMBODIMENTS

Embodiments of the present invention will be described below with reference to the drawings. In the figures described below, the same or corresponding portions are denoted with the same reference characters, and description thereof will not be repeated.

Figure 1:
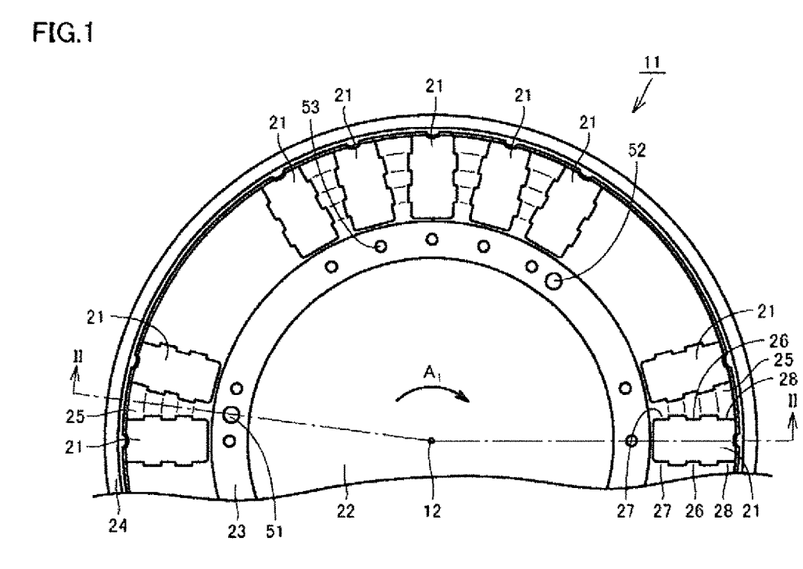
FIG. 1 shows a part of a thrust roller bearing cage according to an embodiment of the present invention.
Figure 2:
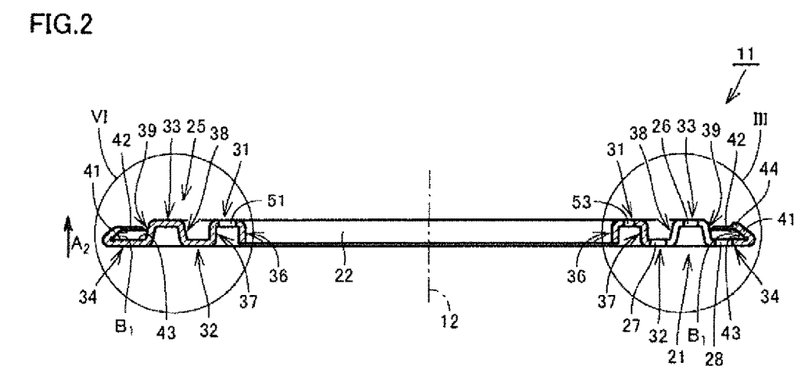
FIG. 2 is a sectional view of the thrust roller bearing cage shown in FIG. 1.
Figure 3:
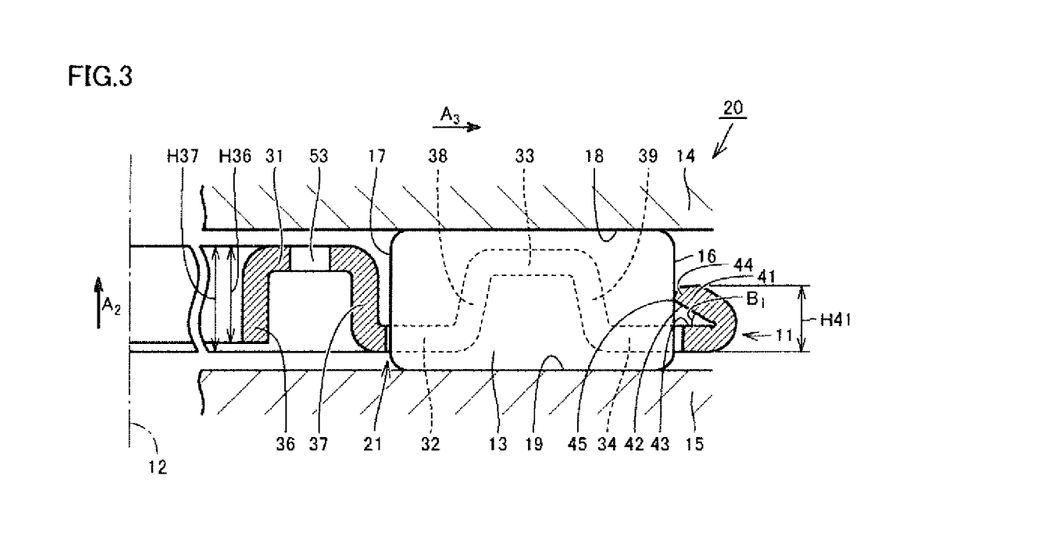
FIG. 3 is an enlarged sectional view showing a part of the thrust roller bearing cage shown in FIG. 2.

FIG. 1 shows a part of a thrust roller bearing cage 11 according to an embodiment of the present invention. FIG. 1 shows the cage 11 as viewed in the direction of the rotation axis of the cage 11. FIG. 2 is a sectional view of the thrust roller bearing cage 11 shown in FIG. 1. FIG. 2 shows the cage 11 taken along line II-II in FIG. 1. Specifically, a portion having a pocket, which will be described later, is shown in section on the right side of FIG. 2, and a portion having a pillar, which will be described later, is shown in section on the left side of FIG. 2. FIG. 3 is an enlarged sectional view showing a part of the thrust roller bearing cage 11 shown in FIG. 2. The enlarged sectional view in FIG. 3 shows the area indicated by III in FIG. 2. In FIGS. 2 and 3, the rotation axis 12 of the cage 11 is shown by an alternate long and short dash line. For ease of understanding, FIG. 3 shows a needle roller 13 accommodated in a pocket 21 that will be described later, and a part of a pair of bearing rings 14, 15 disposed on both sides of the cage 11 in the direction of the rotation axis of the cage 11. The direction perpendicular to the plane of paper of FIG. 1 and the vertical direction in FIGS. 2 and 3 are the direction of the rotation axis of the cage 11 (hereinafter also referred to as the "axial direction"). The direction shown by arrow $A_1$ or its opposite direction in FIG. 1 is the circumferential direction. For ease of understanding, the upper side in FIGS. 2 and 3 is defined as the upper side in the axial direction. That is, the direction shown by arrow $A_2$ in FIGS. 2 and 3 is the upward direction. The lateral direction in FIGS. 2 and 3 is the radial direction. The direction shown by arrow $A_3$ in FIG. 3 is the radially outward direction.

First, the configuration of the thrust roller bearing cage 11 according to the embodiment of the present invention will be described with reference to FIGS. 1 to 3. The thrust roller bearing cage 11 according to the embodiment of the invention is in the shape of a disc and has a through bore 22 extending straight through its central area in the thickness direction of the cage 11. A rotary shaft, not shown, is inserted through the through bore 22.

The cage 11 includes a pair of annular portions 23, 24 with different diameters, and a plurality of pillars 25 formed at intervals in the circumferential direction so as to form the pockets 21 that accommodate the needle rollers 13 therein and connecting the pair of annular portions 23, 24.

The pockets 21 are substantially rectangular as viewed in the axial direction. The pockets 21 are arranged radially about the rotation axis 12 of the cage 11. The pockets 21 have upper roller stoppers 26 and lower roller stoppers 27, 28 on their side wall surfaces. The upper roller stoppers 26 prevent the needle rollers 13 accommodated in the pockets 21 from falling out upward in the axial direction, while the lower roller stoppers 27, 28 prevent the needle rollers 13 accommodated in the pockets 21 from falling out downward in the axial direction. The upper roller stoppers 26 are formed in the middle parts in the radial direction of the pockets 21. The lower roller stoppers 27 are formed in the radially inner parts of the pockets 21, and the lower roller stoppers 28 are formed in the radially outer parts of the pockets 21. The upper roller stoppers 26 and the lower roller stoppers 27, 28 are formed on the side wall surfaces located on both sides in the circumferential direction of each pocket 21 so as to project into the pockets 21.

The needle rollers 13 are pressed into the pockets 21 to fit in the pockets 21. End faces of each needle roller 13, specifically, an outer end face 16 in the bearing and an inner end face 17 in the bearing, are flat.

The cage 11 has concave and convex portions that are formed by bending a plate in the thickness direction thereof a few times. Specifically, the cage 11 includes four disc portions 31, 32, 33, 34 extending in the radial direction and four cylindrical portions 36, 37, 38, 39 extending in the axial direction. The four disc portions 31 to 34 are arranged in this order from the inside in the radial direction so that the first disc portion 31 has the smallest inside diameter, followed by the second disc portion 32, the third disc portion 33, and the fourth disc portion 34 in ascending order. The four cylindrical portions 36 to 39 are arranged in order of the first cylindrical portion 36, the second cylindrical portion 37, the third cylindrical portion 38, and the fourth cylindrical portion 39 from the inside in the radial direction. The first cylindrical portion 36 and the second cylindrical portion 37 extend straight in the axial direction. The third cylindrical portion 38 is slightly tilted so that its radially inner part is located below its radially outer part in the axial direction. The fourth cylindrical portion 39, which is the outermost cylindrical portion in the radial direction, is slightly tilted so that its radially inner part is located above its radially outer part in the axial direction.

More specifically, the first cylindrical portion 36 extends in the axial direction. The first disc portion 31 is formed so as to be continuous with the upper edge of the first cylindrical portion 36 and to extend in the radially outward direction. The second cylindrical portion 37 is formed so as to be continuous with the radially outer edge of the first disc portion 31 and to extend downward in the axial direction. The second disc portion 32 is formed so as to be continuous with the lower edge of the second cylindrical portion 37 and to extend in the radially outward direction. The third cylindrical portion 38 is formed so as to be continuous with the radially outer edge of the second disc portion 32 and to extend upward in the axial direction. The third disc portion 33 is formed so as to be continuous with the upper edge of the third cylindrical portion 38 and to extend in the radially outward direction. The fourth cylindrical portion 39 is formed so as to be continuous with the radially outer edge of the third disc portion 33 and to extend downward in the axial direction. The fourth disc portion 34 is formed so as to be continuous with the lower edge of the fourth cylindrical portion 39 and to extend in the radially outward direction. The first disc portion 31 is substantially flush with the third disc portion 33. The second disc portion 32 is substantially flush with the fourth disc portion 35.

The upper roller stoppers 26 are formed in the third disc portion 33. The lower roller stoppers 27 are formed in the second disc portion 32, and the lower roller stoppers 28 are formed in the fourth disc portion 34.

The inner annular portion 23 in the radial direction includes the first disc portion 31, a part of the second disc portion 32, the first cylindrical portion 36, and the second cylindrical portion 37. The outer annular portion 24 in the radial direction includes a part of the fourth disc portion 34, a radially outer area bent portion 41, and projecting portions 44. The radially outer area bent portion 41 and the projecting portions 44 will be described later. Each pillar 25 includes a part of the second disc portion 32, the third disc portion 33, a part of the fourth disc portion 34, the third cylindrical portion 38, and the fourth cylindrical portion 39. That is, the first cylindrical portion 36, the first disc portion 31, the second cylindrical portion 37, and a part of the second disc portion 32 are located in an area radially inside the pockets 21. A part of the second disc portion 32, the third cylindrical portion 38, the third disc portion 33, the fourth cylindrical portion 39, and a part of the fourth disc portion 34 are located in the same area in the radial direction as the area where the pockets 21 are formed. A part of the fourth disc portion 34 and the radially outer area bent portion 41 are located in an area radially outside the pockets 21.

As shown in FIG. 3, the axial height H36 of the first cylindrical portion 36 is smaller than the axial height H37 of the second cylindrical portion 37. In other words, there is such a difference in height in the area radially inside the pockets 21 that the height in the direction of the rotation axis is smaller on the radially inner side than on the radially outer side. That is, the other edge on the opposite side of the first cylindrical portion 36 from its one edge that is continuous with the first disc portion 31 is located at a position withdrawn toward the one edge with respect to the other edge on the opposite side of the second cylindrical portion 37 from its one edge that is continuous with the first disc portion 31.

Specifically, the lower edge of the first cylindrical portion 36 is located above the lower edge of the second cylindrical portion 37. Clearance provided by this difference in axial height between the first cylindrical portion 36 and the second cylindrical portion 37 serves as a lubricant flow path. In the present embodiment, clearance under the first cylindrical portion 36 located at the innermost position in the radial direction (clearance provided under the lower edge of the first cylindrical portion 36, namely between the lower edge of the first cylindrical portion 36 and an imaginary plane on which the lower edge of the second cylindrical portion 37 is located) serves as a lubricant flow path.

The first disc portion 31 has through holes 53. The through holes 53 serve as a lubricant flow path. The through holes 53 are formed at intervals in the circumferential direction in the first disc portion 31 located radially inside the pockets 21 such that the through holes 53 are respectively located at the positions corresponding to the pockets 21 in the circumferential direction. In order to allow a more satisfactory flow of lubricant, it is preferable that the through holes 53 be formed at regular intervals in the circumferential direction and symmetrically with respect to the rotation axis 12. The through holes 53 may be formed at intervals in the circumferential direction so as to be located at the positions corresponding to a part of the plurality of pockets 21. The through holes 53 extend straight through the cage 11 in the thickness direction, and in the present embodiment, open in a circular shape.

The cage 11 includes the radially outer area bent portion 41 that is formed by bending a radially outer area of the cage 11 inward in the radial direction. In other words, the cage 11 has the radially outer area bent portion 41 that is formed by bending an area located radially outside the pockets 21 inward in the radial direction. The radially outer area bent portion 41 is a standing wall standing in the axial direction and is formed to extend continuously in an annular shape.

The radially outer area bent portion 41 of the present embodiment is formed by bending the area located radially outside the pockets 21 obliquely inward in the radial direction. Specifically, the radially outer area bent portion 41 is formed by bending the radially outer edge of the fourth disc portion 34, which is the outermost disc portion in the radial direction, upward in the axial direction to a predetermined angle.

The angle of the radially outer area bent portion 41, namely the angle between a radially inner surface 42 of the radially outer area bent portion 41 and an upper surface 43 of the fourth disc portion 34, is shown by an angle $B_1$ in FIGS. 2 and 3. This angle may be 0°, but is preferably an acute angle.

The axial height H41 of the radially outer area bent portion 41 is smaller than the axial height H37 of the second cylindrical portion 37. Specifically, the upper edge of the radially outer area bent portion 41 is located below the upper edge of the second cylindrical portion 37. Clearance provided by this difference in axial height between the radially outer area bent portion 41 and the second cylindrical portion 37 serves as a lubricant flow path. In the present embodiment, clearance above the radially outer area bent portion 41 (clearance provided above the upper edge of the radially outer area bent portion 41, namely between the upper edge of the radially outer area bent portion 41 and an imaginary plane on which the upper edge of the second cylindrical portion 37 is located) serves as a lubricant flow path.

In the present embodiment, the axial height H41 of the radially outer area bent portion 41 is smaller than the axial height of the third cylindrical portion 38. That is, the axial height H41 of the radially outer area bent portion 41 is smaller than the axial height of the third cylindrical portion 38 that is the cylindrical portion closest to the radially outer area bent portion 41 among the cylindrical portions located radially inside the radially outer area bent portion 41.

The radially outer area bent portion 41 has the projecting portions 44 formed in its tip end at positions aligned with the pockets 21. That is, the projecting portions 44 are formed at positions aligned with the pockets 21 and face inward in the radial direction. The positions aligned with the pockets 21 are such positions that the outer peripheral edges of the projecting portions 44 overlap the outer peripheral edges of the pockets 21. That is, the radially inner edge of the radially outer area bent portion 41 overlaps the radially outer edges of the pockets 21.

The projecting portions 44 project inward in the radial direction beyond the radially outer edges of the pockets 21 so as to contact the end faces 16 of the rollers 13 accommodated in the pockets 21. Namely, the projecting portions 44 abut on the end faces of the rollers accommodated in the pockets 21 to restrict movement of the rollers toward the outside in the radial direction. Specifically, the projecting portions 44 are shaped to extend continuously from the inner peripheral edge of the radially outer area bent portion 41 toward the inside in the radial direction. That is, the radially outer area bent portion 41 and the projecting portions 44 are formed as a single-piece member.

The projecting portions 44 are formed at such circumferential positions that the tips of the projecting portions 44 are located in the middle parts in the circumferential direction of the pockets 21. Specifically, the projecting portions 44 are formed so that their corners 45 on the surface 42 side, namely the innermost parts in the radial direction of the projecting portions 44 (the innermost corners 45 in the radial direction of the projecting portions 44), contact the centers of the end faces 16 of the needle rollers 13 accommodated in the pockets 21. In this example, the corners 45 are the corners of the projecting portions 44 which are located closer to the fourth disc portion 34.

The cage 11 has three pilot holes 51, 52. The three pilot holes 51, 52 serve as engagement portions for alignment.

One of the pilot holes is not shown in FIG. 1. The three pilot holes 51, 52 are formed at intervals in the circumferential direction and extend straight through the cage 11 in the thickness direction of the cage 11. The three pilot holes 51, 52 open in a circular shape. The three pilot holes 51, 52 are formed substantially equally spaced apart from each other. In this example, the three pilot holes 51, 52 are formed at intervals of 120 degrees about the rotation axis 12 of the cage 11. Specifically, the pilot holes 51, 52 are formed in the middle part in the radial direction of the innermost first disc portion 31 in the radial direction. For example, the diameter of the pilot holes 51, 52 is φ2.5 mm or φ3 mm.

The pilot holes 51, 52 may be omitted, and the through holes 53 serving as a lubricant flow path may be used as the pilot holes. In the case where both the pilot holes 51, 52 and the through holes 53 are formed, it is preferable in terms of strength that the through holes 53 be smaller than the pilot holes 51, 52.

For example, the thrust roller bearing 20 having such a cage 11 includes the plurality of needle rollers 13, the upper bearing ring 14, and the lower bearing ring 15. When the thrust roller bearing 20 is in operation, the needle rollers 13 accommodated in the pockets 21 roll on a raceway surface 18 of the upper bearing ring 14 in the axial direction and a raceway surface 19 of the lower bearing ring 15 in the axial direction. The cage 11 rotates around its rotation axis 12. Each of the needle rollers 13 accommodated in the pockets 21 revolves while rotating around its axis. The needle rollers 13 are subjected to a radially outward centrifugal force. The centers of the end faces 16 of the needle rollers 13 make sliding contact with the projecting portions 44 of the cage 11, specifically the innermost corners 45 in the radial direction of the projecting portions 44 of the cage 11. That is, the corners 45 of the projecting portions 44 are the areas that contact the end faces 16 of the needle rollers 13.

The corners 45 have been press-flattened. The corners 45 subjected to the press-flattening process have no sharply pointed parts and smoothly connect to the surfaces forming the corners 45. This reduces aggression of the corners 45 against members that are contacted by the corners 45.

Figure 4:
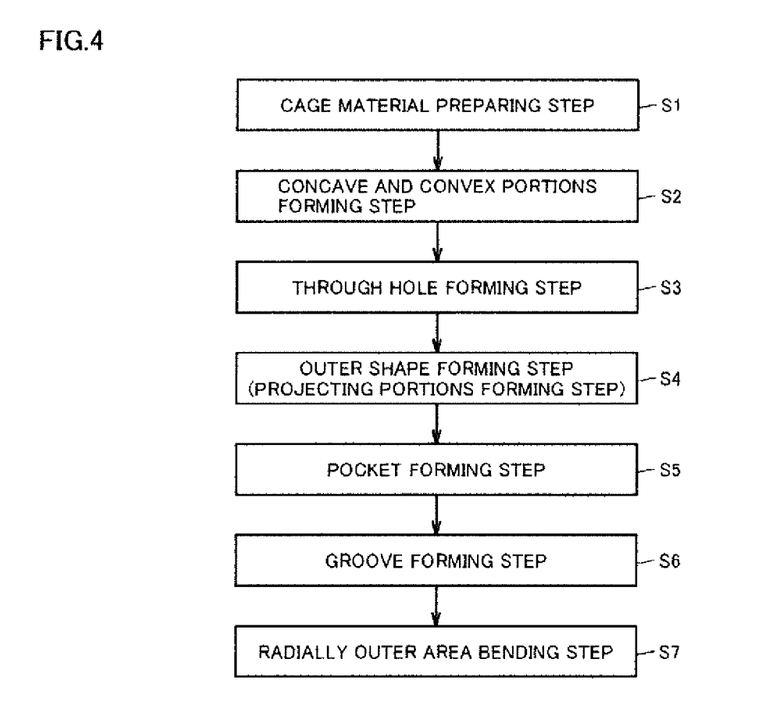
FIG. 4 is a flowchart illustrating representative steps of a method for manufacturing the thrust roller bearing cage according to the embodiment of the present invention.

Next, a method for manufacturing the thrust roller bearing cage 11 according to the embodiment of the present invention will be described. The thrust roller bearing cage 11 is manufactured by using a transfer press. The transfer press is a relatively inexpensive press machine with a less complicated configuration. FIG. 4 is a flowchart illustrating representative steps of the method for manufacturing the thrust roller bearing cage 11 according to the embodiment of the present invention.

Referring to FIG. 4, a cage material, which will later become the cage 11, is first prepared (cage material preparing step: step S1). For example, the cage material is a thin flat steel sheet. At this stage, the cage material may be either a plate cut into a substantially rectangular shape or a circular plate, as the final outer shape of the cage is formed in an outer shape forming step (step S4) that will be performed later.

Next, concave and convex portions are formed in the cage material in the thickness direction of the cage material (concave and convex portions forming step: step S2). As shown in FIG. 2, the first cylindrical portion 36 extending in the axial direction, the first disc portion 31 continuous with the first cylindrical portion 36 and extending in the radially outward direction, and the second cylindrical portion 37 continuous with the first disc portion 31 and extending in the axial direction are formed in this step. In this step (step S2), the first cylindrical portion 36, the first disc portion 31, and the second cylindrical portion 37 are formed in an area located radially inside pockets to be formed in a pocket forming step (step S5) that will be described later. Performing this step ensures that the cage 11 has a large length dimension in the direction of its rotation axis even if the cage 11 is in the shape of a thin plate, whereby the cage 11 can appropriately retain the rollers.

Figure 5:
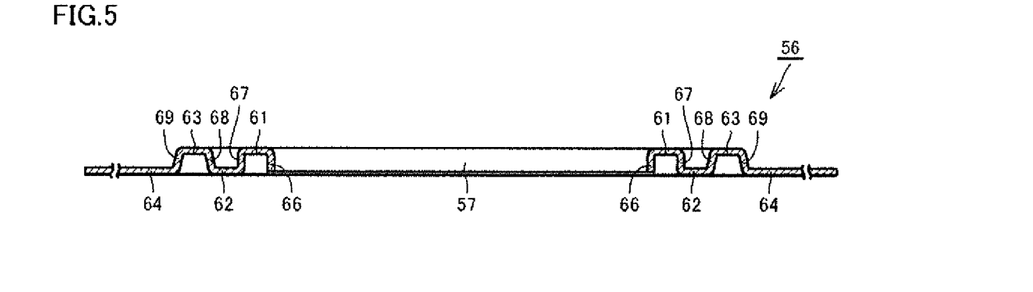
FIG. 5 is a sectional view of a cage material after a concave and convex portions forming step.

Specifically, in this step, the cage material is subjected to a drawing process. In this case, the concave and convex portions can be formed more efficiently. FIG. 5 is a sectional view of the cage material after the concave and convex portions forming step. The section shown in FIG. 5 corresponds to the section shown in FIG. 2. Specifically, referring to FIG. 5, a flat plate-like cage material 56 is subjected to a drawing process to form first to fourth disc portions 61 to 64 and first to fourth cylindrical portions 66 to 69. A circular through bore 57 is formed in the central part of the cage material 56 so as to extend therethrough in the thickness direction. That is, in this case, the cage material 56 has what is called a mountain-and-valley shape made by bending the cage material 56 a plurality of times in the axial direction.

In this step, the first cylindrical portion 66 is formed so as to have a smaller axial height than the second cylindrical portion 67. Clearance provided by this difference in axial height between the first cylindrical portion 66 and the second cylindrical portion 67 (clearance under the first cylindrical portion 66) will serve as a lubricant flow path in the cage.

Thereafter, through holes that will serve as a lubricant flow path are formed in the first disc portion 31 (through hole forming step: step S3). The step of forming pilot holes that will serve as engagement portions (pilot hole forming step) may also be performed in this step.

Figure 6:
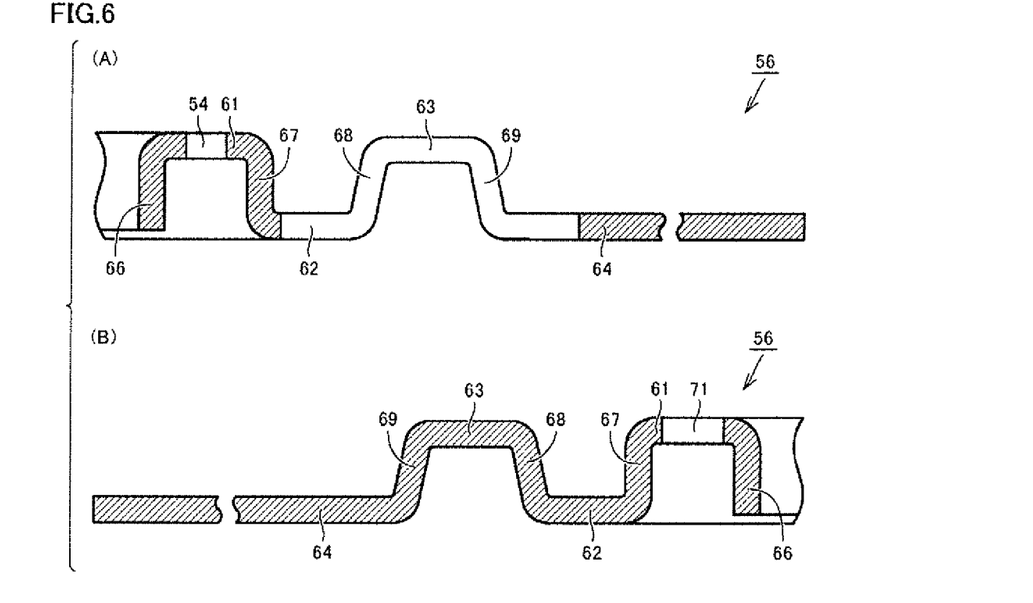
FIG. 6(A) is an enlarged sectional view showing a part of the cage material after a through hole forming step.
FIG. 6(B) is an enlarged sectional view showing a part of the cage material after a pilot hole forming step.

FIGS. 6(A) and 6(B) are enlarged sectional views showing a part of the cage material 56 after formation of the through holes. FIG. 6(A) shows the cage material 56 having the through holes 54 formed therethrough as a lubricant flow path, and FIG. 6(B) shows the cage material 56 having pilot holes 71 formed therethrough. The section shown in FIG. 6(A) corresponds to the area III in FIG. 2, and the section shown in FIG. 6(B) corresponds to the area VI in FIG. 2.

The through hole 54 shown in FIG. 6(A), which will serve as a lubricant flow path, and the pilot hole 71 shown in FIG. 6(B), which will serve as an engagement portion, are formed in the middle part in the radial direction of the first disc portion 61 so as to extend straight through the first disc portion 61 in the thickness direction. The through holes 54 are formed at intervals in the circumferential direction so as to be substantially equally spaced apart from each other such that the through holes 54 are located at the positions corresponding to the pockets to be formed in the pocket forming step (step S5) that will be described later. Three of the pilot holes 71 are formed in total at intervals of 120 degrees in the circumferential direction so as to be substantially equally spaced apart from each other.

The through hole forming step, i.e., the step of forming the through holes 54, and the pilot hole forming step may be performed simultaneously, one of the through hole forming step and the pilot hole forming step may be performed first, or the pilot hole forming step may be omitted. In the through hole forming step, the plurality of through holes 54 may be punched out either all at once or one by one.

Figure 7:
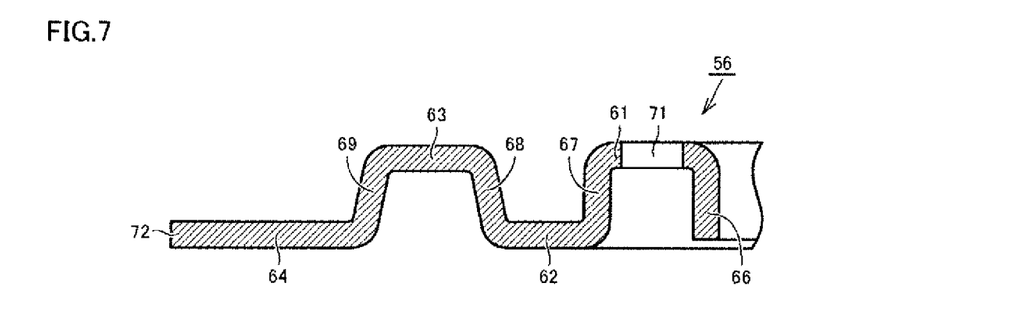
FIG. 7 is an enlarged sectional view showing a part of the cage material after an outer shape forming step.

Subsequently, the outer shape of the cage material 56 is formed (outer shape forming step: step S4). FIG. 7 is an enlarged sectional view showing a part of the cage material 56 after the outer shape forming step. The section shown in FIG. 7 corresponds to the area VI shown in FIG. 2, and is a section taken along line VII-VII in FIG. 8. Specifically, in this example, the cage material 56 is punched straight in the thickness direction so that the cage 11 can be formed into the final outer shape by a radially outer area bending step (step S7) etc. that will be performed later. In this case, the outer shape of the cage material 56 can be formed relatively easily and accurately. A radially outer edge 72 of the cage 11, specifically, a radially outer edge 72 of the fourth disc portion 64, is thus formed.

Figure 8:
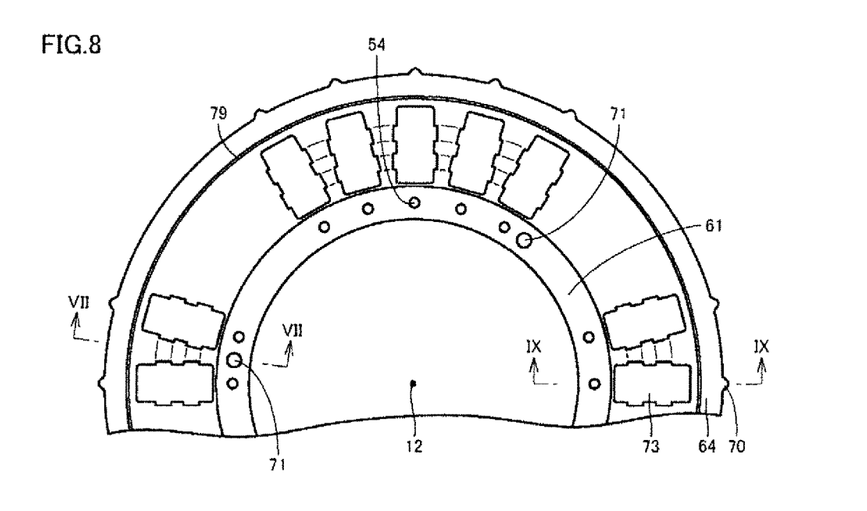
FIG. 8 shows a part of the cage material after a pocket forming step.

When forming the outer shape, the cage material 56 is punched so as to form portions that will later become projecting portions 70. That is, in this case, the outer shape forming step is also a projecting portions forming step, i.e., the step of forming the projecting portions. FIG. 8 shows a part of the cage material 56 after the pocket forming step, which is the step following the outer shape forming step. FIG. 8 corresponds to FIG. 1. When punching the cage material 56 so as to form the projecting portions 70, the cage material 56 is aligned in the circumferential direction by using the plurality of pilot holes 71. Specifically, a plurality of guide pins (not shown), which serve as what is called pencil-like alignment jigs having a pointed end and having a tapered shape with its diameter gradually increasing from the pointed end, are prepared and are gradually inserted into the plurality of pilot holes 71 from one side in the thickness direction. The cage material 56 is thus aligned by using the plurality of guide pins and is punched into the overall outer shape with a punching machine (not shown) in view of the positions, shape, etc. of the projecting portions 70. Accordingly, even if the cage material 56 is slightly out of alignment with the punching machine with respect to the proper positions where the projecting portions 70 are supposed to be formed, the cage material 56 can be aligned with the punching machine with respect to the proper positions where the projecting portions 70 are supposed to be formed, as the pencil-like guide pins having a pointed end are gradually inserted into the pilot holes 71. The punching process can thus be performed. In this example, since the cage material 56 has the three pilot holes 71, rotation etc. of the cage material 56 is prevented during alignment. The cage material 56 can thus be aligned more accurately.

Figure 9:
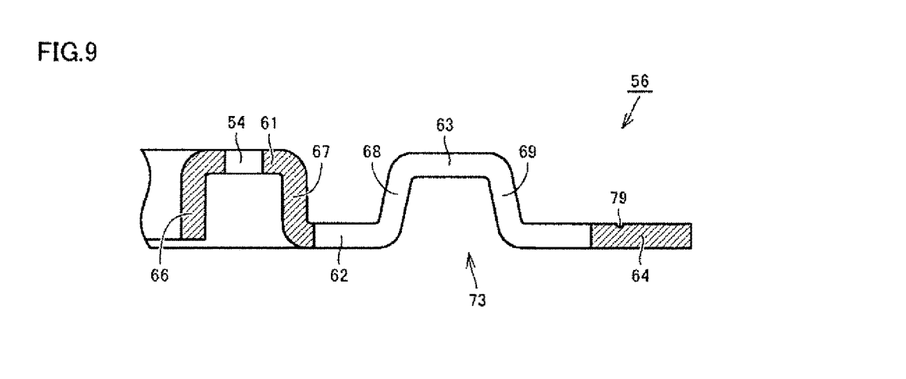
FIG. 9 is an enlarged sectional view showing a part of the cage material after the pocket forming step.

Subsequently, the pockets are formed at positions radially outside the second cylindrical portion (pocket forming step: step S5). FIG. 9 is an enlarged sectional view showing a part of the cage material after the pocket forming step. The section shown in FIG. 9 corresponds to the area III shown in FIG. 2 and is a section taken along line TX-IX in FIG. 8. In this example, each pocket 73 is punched out along a part of the second disc portion 62, the third disc portion 63, and a part of the fourth disc portion 64 and also along the third cylindrical portion 68 and the fourth cylindrical portion 69 so as to extend straight through the cage material 56 in the thickness direction. Although not shown in FIG. 9, the upper roller stoppers and the lower roller stoppers, which are shaped so as to project into the pockets 73 in the circumferential direction, are formed simultaneously with the pockets 73. That is, the pockets 73 are punched out in view of the shape of the upper roller stoppers and the lower roller stoppers so as to conform to the outer shape of needle rollers 13 that are to be accommodated in the pockets 73. The plurality of pockets 73 may be punched out either all at once or one by one.

When forming the pockets 73 in the cage material 56, the pilot holes 71 are also used to align the cage material 56 to be punched with a punching machine (not shown) for punching out the pockets. That is, the pockets 73 are formed with respect to the positions of the pilot holes 71. As in the case of the outer shape forming step, alignment in the circumferential direction is performed by using the plurality of pilot holes 71. Specifically, a plurality of guide pins serving as sharp pencil-like alignment jigs are prepared and the tip ends of the guide pins are gradually inserted into the plurality of pilot holes 71 from one side in the thickness direction as described above. The cage material 56 is thus aligned by using the plurality of guide pins, and the pockets 73 are punched out with the punching machine in view of the positions, shape, etc. of the pockets 73. The pockets 73 are thus formed in phase with the projecting portions 70 in the circumferential direction, so that an appropriate positional relationship can be established between the pockets 73 and the projecting portions 70. Accordingly, the projecting portions 70 can be accurately and efficiently formed in terms of the positional relationship of the projecting portions 70 with the pockets 73. Since the projecting portions 44 are accurately formed at the appropriate positions, end faces 16 of the needle rollers 13 can appropriately contact the projecting portions 44 when the bearing is in operation. The plurality of pockets 73 may be punched out either all at once or one by one.

In the present embodiment, the pilot holes 71 are formed in the area located radially inside the pockets 73. In this case, the pilot holes 71 can be formed by making effective use of the available area of the cage 11.

In the present embodiment, the pilot holes 71 are formed so as not to overlap the pockets 73 in the circumferential direction. This can avoid local strength reduction in the circumferential direction of the cage 11. The positional relationship of the pockets 73 with the pilot holes 71 can be determined as desired. Specifically, in this example, the plurality of pockets 73 are formed so that each of the pilot holes 71 is located at a position corresponding to the middle in the circumferential direction between adjoining ones of the pockets 73.

Subsequently, as shown in FIGS. 8 and 9, an annular groove 79 is formed at a position radially outside the pockets 73 in the cage material (groove forming step: step S6). In this step (step SC), the groove 79 is formed at such a position that the cage material is to be bent along the groove 79 when forming a radially outer area bent portion 41 in the radially outer area bending step (step S7) that will be described below. Although performing the groove forming step (step S6) makes it easier to bend a radially outer area of the cage material 56 inward in the radially outer area bending step (step S7) described below, the groove forming step (step S6) may be omitted. The steps S4 to S6 may be performed in any order.

Subsequently, an area of the cage material 56 which is located radially outside the pockets 73 is bent inward in the radial direction to form a radially outer area bent portion (radially outer area bending step: step S7). In this step, the radially outer area bent portion is formed so as to have a smaller axial height than the second cylindrical portion 67. Clearance provided by the difference in axial height between the radially outer area bent portion and the second cylindrical portion 67 (clearance above the radially outer area bent portion) will serve as a lubricant flow path in the cage.

In this step, it is preferable that the area of the cage material 56 which is located radially outside the pockets 73 be bent obliquely inward in the radial direction to an acute tilt angle to form the radially outer area bent portion. In the case where the groove forming step (step S6) is performed, a radially outer area of the cage material 56 is bent along the groove 79 to form the radially outer area bent portion.

Figure 10:
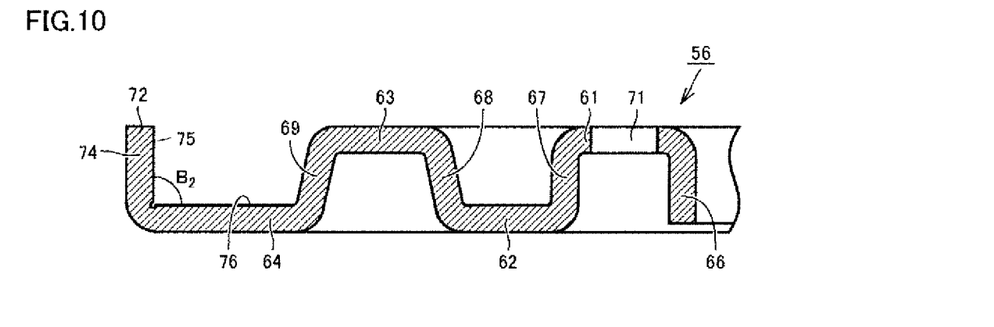
FIG. 10 is an enlarged sectional view showing a part of the cage material during a radially outer area bending step.
Figure 11:
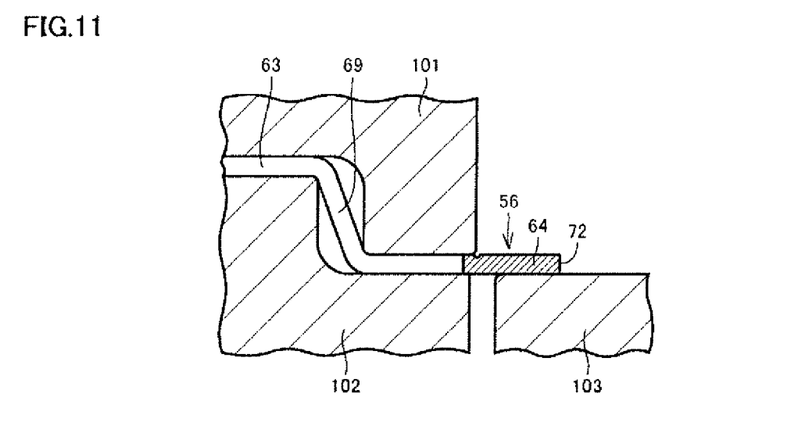
FIG. 11 is an enlarged sectional view illustrating how the radially outer area bending step is performed.
Figure 12:
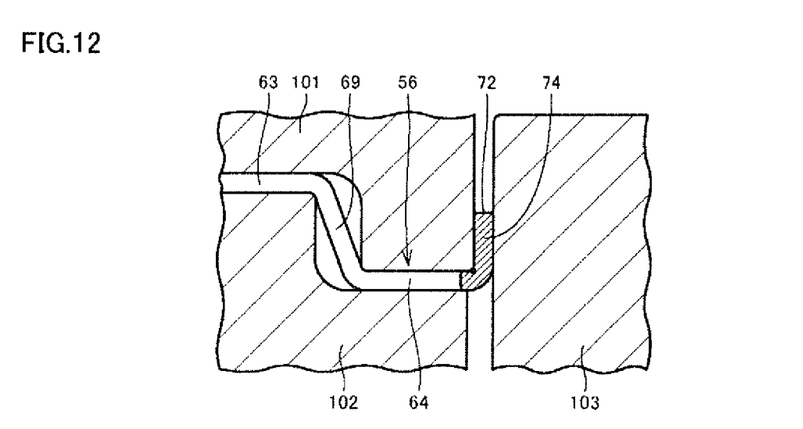
FIG. 12 is an enlarged sectional view illustrating how the radially outer area bending step is performed.
Figure 13:
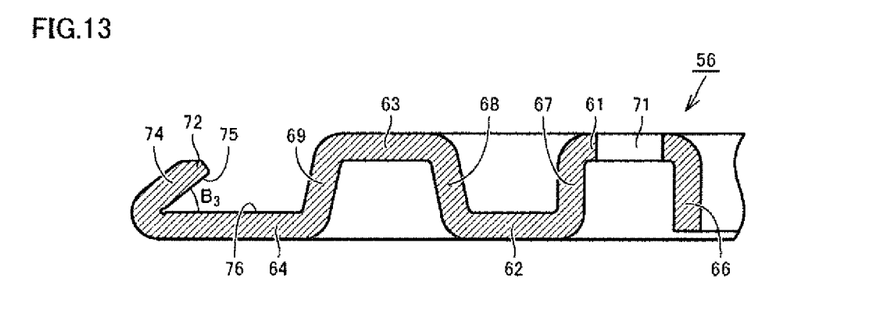
FIG. 13 is an enlarged sectional view showing a part of the cage material after the radially outer area bending step.
Figure 14:
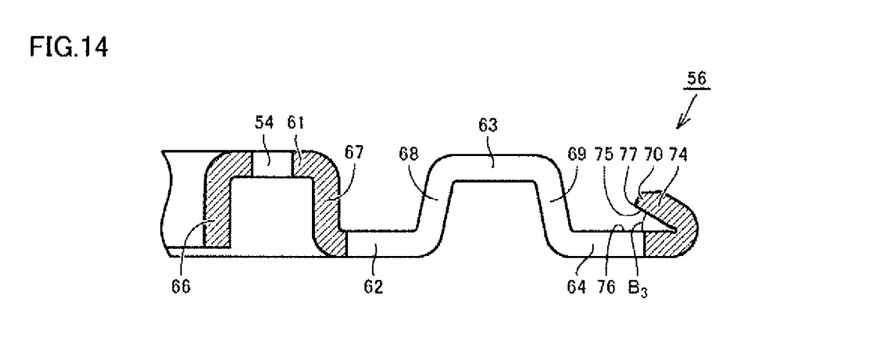
FIG. 14 is an enlarged sectional view showing a part of the cage material after the radially outer area bending step.

FIG. 10 is an enlarged sectional view showing a part of the cage material during the radially outer area bending step. FIGS. 11 and 12 are enlarged sectional views illustrating how the radially outer area bending step is performed. FIGS. 13 and 14 are enlarged sectional views showing a part of the cage material 56 after the radially outer area bending step. The sections shown in FIGS. 10 and 13 correspond to the area VI in FIG. 2. The section shown in FIG. 14 corresponds to the area III in FIG. 2. The sections shown in FIGS. 11 and 12 show the positional relationship of an area of the cage material 56 which is located radially outside the position corresponding to the area VI in FIG. 2 with holding members 101, 102 and a pressing member 103. In this example, as shown in FIG. 10, the annular radially outer edge 72 of the cage material 56 is first bent along the entire circumference so as to extend straight in the thickness direction. That is, the angle $B_2$ between a radially inner surface 75 of a radially outer area bent portion 74 and an upper surface 76 of the fourth disc portion 64 is approximately a right angle. For example, the radially outer edge 72 is bent to a right angle by the following method, although the present invention is not particularly limited to this method. As shown in FIG. 11, the entire cage material 56 except for a radially outer area of the fourth disc portion 64 is sandwiched between the holding members 101, 102 in the vertical direction and is held therebetween, and the pressing member 103 is placed under the radially outer area of the fourth disc portion 64. As shown in FIG. 12, the pressing member 103 is then moved upward. The radially outer area bent portion 74 can thus be formed at a right angle with respect to the fourth disc portion 64.

Subsequently, as shown in FIGS. 13 and 14, the radially outer area bent portion 74 is tilted further inward in the radial direction, whereby the radially outer area bent portion 74 is formed. In this case, the bending angle (tilt angle), that is, the angle between the radially inner surface 75 of the radially outer area bent portion 74 and the upper surface 76 of the fourth disc portion 64 is shown by an angle $B_3$ in FIGS. 13 and 14. The angle $B_3$ corresponds to the angle $B_1$ described above. In other words, the angle $B_1$ is equal to the angle $B_3$. The angles $B_1$, $B_3$ are preferably an acute angle.

In this example, in terms of the positional relationship in the circumferential direction, the projecting portions 70 are formed at the positions corresponding to the middle parts in the circumferential direction of the pockets 73. The projecting portions 70 are thus formed at appropriate positions. Specifically, the projecting portions 70 abut on the centers of the end faces 16 of the needle rollers 13 at their corners 77 located closer to the fourth disc portion 64. Finally, the areas of the projecting portions 70 which are to contact the end faces 16 of the needle rollers 13 are subjected to a press-flattening process. The thrust roller bearing cage 11 configured as shown in FIGS. 1 to 3 is thus manufactured.

Figure 15:
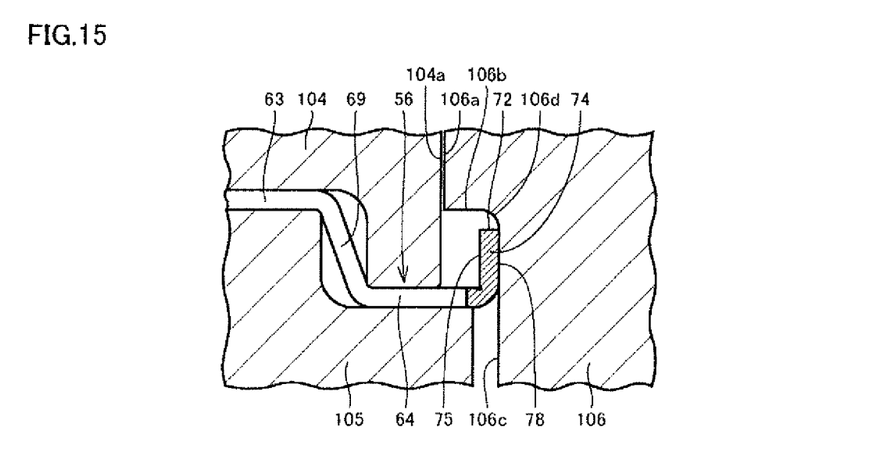
FIG. 15 is an enlarged sectional view illustrating how the radially outer area bending step is performed.
Figure 16:
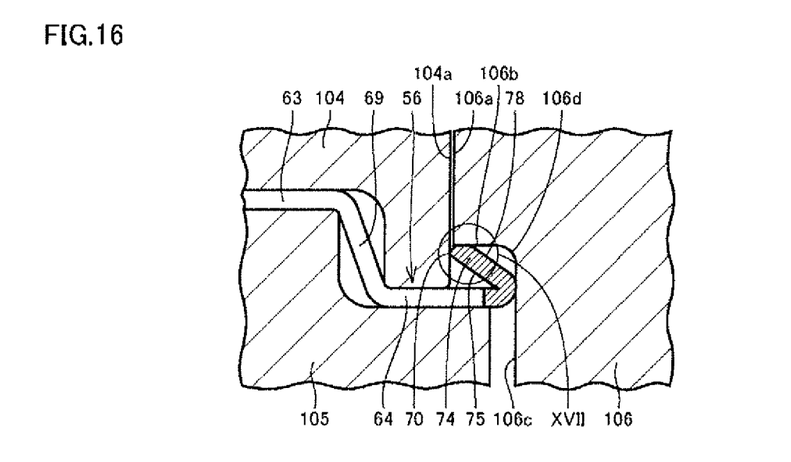
FIG. 16 is an enlarged sectional view illustrating how a press-flattening step is performed.
Figure 17:
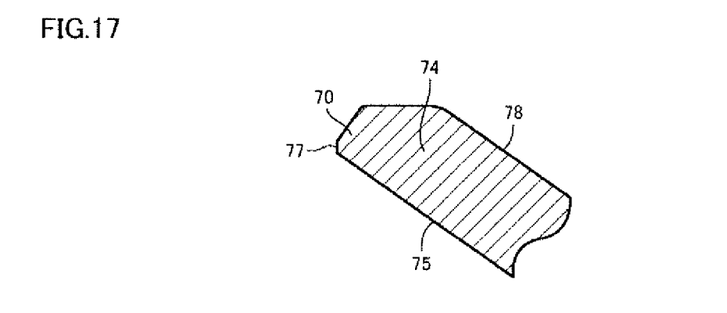
FIG. 17 is an enlarged sectional view showing the tip of a radially outer area bent portion after the press-flattening step.

The step of tilting the radially outer edge 72 of the cage material 56 inward in the radial direction after the annular radially outer edge 72 is bent so as to extend straight in the thickness direction and the press-flattening process may be performed successively. FIG. 15 is an enlarged sectional view illustrating how the radially outer area bending step is performed. FIG. 16 is an enlarged sectional view illustrating how the press-flattening step is performed. FIG. 17 is an enlarged sectional view showing the tip of the radially outer area bent portion after the press-flattening step. Specifically, as shown in FIG. 15, after the cage material 56 is bent so that the radially outer area bent portion 74 extends at a right angle with respect to the fourth disc portion 64, an area of the cage material 56 which is located radially inside the radially outer area bent portion 74 is sandwiched between dies 104, 105 in the vertical direction and is held therebetween. At this time, the radially outer edge of the upper die 104 is located radially inside the radially outer edge of the lower die 105. A die 106 that presses the radially outer area bent portion 74 downward from above is also placed so as to contact a radially outer surface 78 of the radially outer area bent portion 74. The die 106 includes a radially inner end face 106a that faces the upper die 104 and extends in the vertical direction, a horizontal face 106b that is continuous with the radially inner end face 106a and extends outward in the radial direction, and a radially inner face 106c that faces the radially outer surface 78 of the radially outer area bent portion 74 and extends in the vertical direction. A part 106d of the die 106 where the horizontal face 106b and the radially inner face 106c meet has a round (R) shape. When the die 106 is moved downward so that the radially inner end face 106a moves along a radially outer end face 104a of the die 104, the radially outer area bent portion 74 can be tilted inward in the radial direction as guided by the round part 106d. Subsequently, as shown in FIG. 16, the die 104 is moved further downward so that the radially inner corner of the radially outer area bent portion 74 is smoothed by the radially outer end face 104a of the die 104 and the radially outer corner of the radially outer area bent portion 74 is smoothed by the horizontal face 106b of the die 106. As shown in FIG. 17, the projecting portions 70 subjected to the press-flattening process in the areas of the projecting portions 70 which are to contact the end faces of the rollers can be formed in this manner.

As described above, according to the thrust roller bearing cage 11 of the present embodiment and the method for manufacturing the same, the concave and convex portions are formed in the thickness direction in the area located radially inside the pockets 21, 73 by the first cylindrical portion 36, 66, the first disc portion 31, 61, and the second cylindrical portion 37, 67. Forming the concave and convex portions can increase strength of the cage 11 and can prevent bending of the cage 11. However, such concave and convex portions tend to reduce a flow of lubricant. In the present embodiment, even though the cage 11 has the concave and convex portions, the first cylindrical portion 36, 66 and the second cylindrical portion 37, 67 which form the concave and convex portions are formed so that the height H36 of the first cylindrical portion 36, 66 in the direction of the rotation axis of the cage 11 is smaller than the height H37 of the second cylindrical portion 37, 67 in the direction of the rotation axis of the cage 11 and clearance provided by this difference in height in the direction of the rotation axis between the first cylindrical portion 36, 66 and the second cylindrical portion 37, 67 serves as a lubricant flow path. This allows a flow of lubricant toward the outside in the radial direction due to a centrifugal force, whereby satisfactory circulation of the lubricant can be achieved. Accordingly, satisfactory circulation of lubricant can be achieved with a small amount of lubricant (lean lubrication condition), namely without increasing the amount of lubricant.

In the thrust roller bearing cage of the present embodiment and the method for manufacturing the same, it is preferable that the height H41 of the radially outer area bent portion 41, 74 in the direction of the rotation axis of the cage 11 be smaller than the height H37 of the second cylindrical portion 37, 67 in the direction of the rotation axis of the cage 11. That is, the height H36 of the first cylindrical portion 36, 66, which is located at the innermost position in the radial direction in the cage 11, in the direction of the rotation axis of the cage 11 and the height H41 of the radially outer area bent portion 41, 74, which located at the outermost position in the radial direction in the cage 11, in the direction of the rotation axis of the cage 11 are smaller than the height H37 of the second cylindrical portion 37, 67 in the direction of the rotation axis of the cage 11, which is the largest height in the direction of the rotation axis of the cage 11. Clearance provided by this difference in height in the direction of the rotation axis between the radially outer area bent portion 41, 74 and the second cylindrical portion 37, 67 thus also serves as a lubricant flow path. Accordingly, more satisfactory circulation of lubricant can be achieved in a lean lubrication condition.

Figure 18:
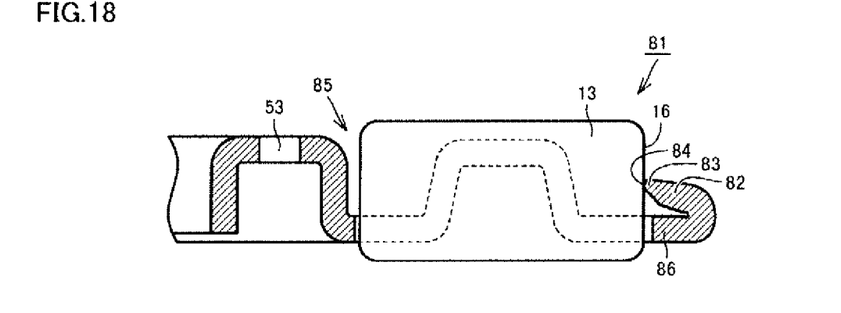
FIG. 18 is a sectional view showing a part of a thrust roller bearing cage according to another embodiment of the present invention.

In the above embodiment, the corners of the projecting portions which are located closer to the fourth disc portion contact the centers of the end faces of the needle rollers accommodated in the pockets. However, the present invention may have the following configuration. FIG. 18 is a sectional view showing a part of a cage having this configuration. FIG. 18 corresponds to the section shown in FIG. 3.

Referring to FIG. 18, a thrust roller bearing cage 81 according to another embodiment of the present invention has a radially outer area bent portion 82 having projecting portions 83 formed at positions corresponding to the positions of pockets 85. The projecting portions 83 contact the centers of end faces 16 of needle rollers 13 accommodated in the pockets 85 at corners 84 located on the opposite side of the projecting portions 83 from a fourth disc portion 86. The corners 84 have been press-flattened. This configuration can be achieved by machining the corners 84 with a jig angled so as to conform to the corner 84 in the radially outer area bending step.

Figure 19:
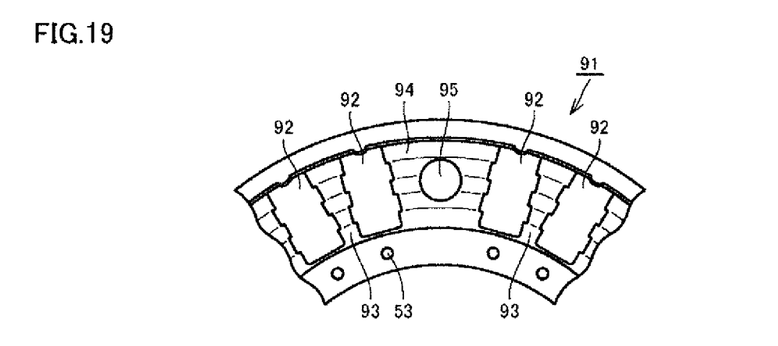
FIG. 19 shows a part of a thrust roller bearing cage according to still another embodiment of the present invention.

A pilot hole may be formed at a position where a pocket is supposed to be formed. In other words, one of the plurality of pockets may be used as a pilot hole. FIG. 19 shows a part of a cage having this configuration. Referring to FIG. 19, a thrust roller bearing cage 91 according to still another embodiment of the present invention includes a plurality of pockets 92 and pillars 93 each located between adjoining two of the pockets 92. A pilot hole 95 is formed at a position where a pocket 92 is supposed to be formed in a pillar 94 located between the pockets 92. In this configuration, one of the plurality of pockets 92 that are formed equally spaced apart from each other in the circumferential direction is replaced with this pilot hole 95.

Although the pilot holes are formed as engagement portions, the present invention is not limited to this. The engagement portions may have other configurations. For example, the engagement portions may be formed by cutouts.

In the above embodiment, the through holes 53 serving as a lubricant flow path and the pilot holes 51, which are shown in FIG. 1, extend straight through the cage in the thickness direction. However, the present invention is not limited to this. For example, the through holes 53 and/or the pilot holes 51, which extend through the cage, may have a tapered wall surface. The through holes 53 and the pilot holes 51 are not limited to the circular holes and may be quadrilateral holes, triangular holes, etc.

In the above embodiment, a drawing process is performed in the concave and convex portions forming step. However, the present invention is not limited to this. A process other than the drawing process, such as a bending process, may be used to form concave and convex portions.

In the above embodiment, the cage has the concave and convex portions that are formed in the thickness direction. However, as long as the first cylindrical portion 36, the first disc portion 31, and the second cylindrical portion 37 are formed in an area located radially inside the pockets 21, the cage may not have concave and convex portions that are formed in the thickness direction in the same area in the radial direction as the area where the pockets 21 are formed and an area located radially outside the pockets 21.

In the above embodiment, the thrust roller bearing having such a cage as described above may not have bearing rings. Rollers other than the needle rollers, such as long rollers etc., may be used.

The embodiments disclosed herein are by way of example in all respects and should not be interpreted as restrictive. The scope of the present invention is defined by the claims rather than by the above embodiments, and the invention is intended to cover all changes and modifications within the spirit and scope of the invention as defined by the claims.

INDUSTRIAL APPLICABILITY

The thrust roller bearing cage according to the present invention and the method for manufacturing the same are effectively utilized to meet demands for thrust roller bearing cages with excellent performance and more efficient methods for manufacturing such a thrust roller bearing cage.

REFERENCE SIGNS LIST 11, 81, 91 Cage
12 Rotation Axis
13 Roller
14, 15 Bearing Ring
16, 17 End Face
18, 19 Raceway Surface
20 Thrust Roller Bearing
21, 73, 85, 92 Pocket
22, 53, 54, 57 Through Bore or Through Hole
23, 24 Annular Portion
25, 93, 94 Pillar
26, 27, 28 Roller Stopper
31, 32, 33, 34, 61, 62, 63, 64, 86 Disc Portion
36, 37, 38, 39, 66, 67, 68, 69 Cylindrical Portion
41, 74, 82 Radially Outer Area Bent Portion
42, 43, 75, 76, 78 Surface
44, 70, 83 Projecting Portion
45, 77, 84 Corner
51, 52, 71, 95 Pilot Hole
56 Cage Material
72 Edge
79 Groove
101, 102 Holding Member
103 Pressing Member
104, 105, 106 Die
104a Radially Outer End Face
106a Radially Inner End Face
106b Horizontal Face
106c Radially Inner Face
106d Part

The invention claimed is:
1. A thrust roller bearing comprising a thrust roller bearing cage including a plurality of pockets accommodating rollers, the thrust bearing roller cage comprising:
a first cylindrical portion extending in a direction of a rotation axis;
a disc portion continuous with the first cylindrical portion and extending in a radially outward direction; and a second cylindrical portion continuous with the disc portion and extending in the direction of the rotation axis, wherein the first cylindrical portion, the disc portion, and the second cylindrical portion are formed in an area located radially inside the pockets, the first cylindrical portion has a smaller height in the direction of the rotation axis than the second cylindrical portion, and the disc portion has through holes extending through in the direction of the rotation axis and formed at intervals in a circumferential direction such that the through holes are respectively located at positions corresponding to the pockets in the circumferential direction, and each through hole faces a raceway surface of each of a bearing ring in the direction of the rotation axis.

2. The thrust roller bearing according to claim 1, the thrust roller bearing cage further comprising:

a radially outer area bent portion formed by bending an area located radially outside the pockets inward in a radial direction; and projecting portions that are formed in a tip end of the radially outer area bent portion at positions aligned with the pockets and project inward in the radial direction beyond radially outer edges of the pockets so as to contact end faces of the rollers accommodated in the pockets.

3. The thrust roller bearing according to claim 2, wherein the radially outer area bent portion has a smaller height in the direction of the rotation axis than the second cylindrical portion.

4. The thrust roller bearing according to claim 2, wherein areas of the projecting portions which are to contact the end faces of the rollers are subjected to a press-flattening process.

5. The thrust roller bearing according to claim 2, wherein the projecting portions are formed by bending a radially outer area of the cage obliquely inward in the radial direction.

6. A method for manufacturing a thrust roller bearing including a thrust roller bearing cage having a plurality of pockets accommodating rollers, comprising the steps of:

preparing a cage material that will later become the cage;

forming concave and convex portions in a thickness direction in the cage material;

forming through holes in the cage material, and forming the pockets in the cage material, wherein in the step of forming the concave and convex portions, the concave and convex portions are formed so as to form a first cylindrical portion extending in a direction of a rotation axis, a disc portion continuous with the first cylindrical portion and extending in a radially outward direction, and a second cylindrical portion continuous with the disc portion and extending in the direction of the rotation axis and so that the first cylindrical portion has a smaller height in the direction of the rotation axis than the second cylindrical portion, in the step of forming the through holes, the disc portion has the through holes extending through in the direction of the rotation axis and formed at intervals in a circumferential direction such that the through holes are respectively located at positions corresponding to the pockets in the circumferential direction and in the step of forming the pockets, the pockets are formed at positions radially outside the second cylindrical portion, positioning the cage so that each through hole faces a raceway surface of each of the bearing ring in the direction of the rotation axis.

7. The method of manufacturing the thrust roller bearing according to claim 6, further comprising the steps of:

forming an outer shape of the cage material so that the outer shape has portions that will later become projecting portions projecting inward in a radial direction beyond radially outer edges of the pockets so as to contact end faces of the rollers accommodated in the pockets; and forming a radially outer area bent portion by bending an area of the cage material which is located radially outside the pockets inward in the radial direction.

8. The method of manufacturing the thrust roller bearing according to claim 7, wherein in the step of forming the radially outer area bent portion, the radially outer area bent portion is formed so as to have a smaller height in the direction of the rotation axis than the second cylindrical portion.

9. The method of manufacturing the thrust roller bearing according to claim 7, further comprising the step of:

press-flattening areas of the projecting portions which are to contact the end faces of the rollers.

10. The method of manufacturing the thrust roller bearing according to claim 7, wherein in the step of forming the radially outer area bent portion, the area of the cage material which is located radially outside the pockets is bent obliquely inward in the radial direction.

* * * * *